Figure 1:
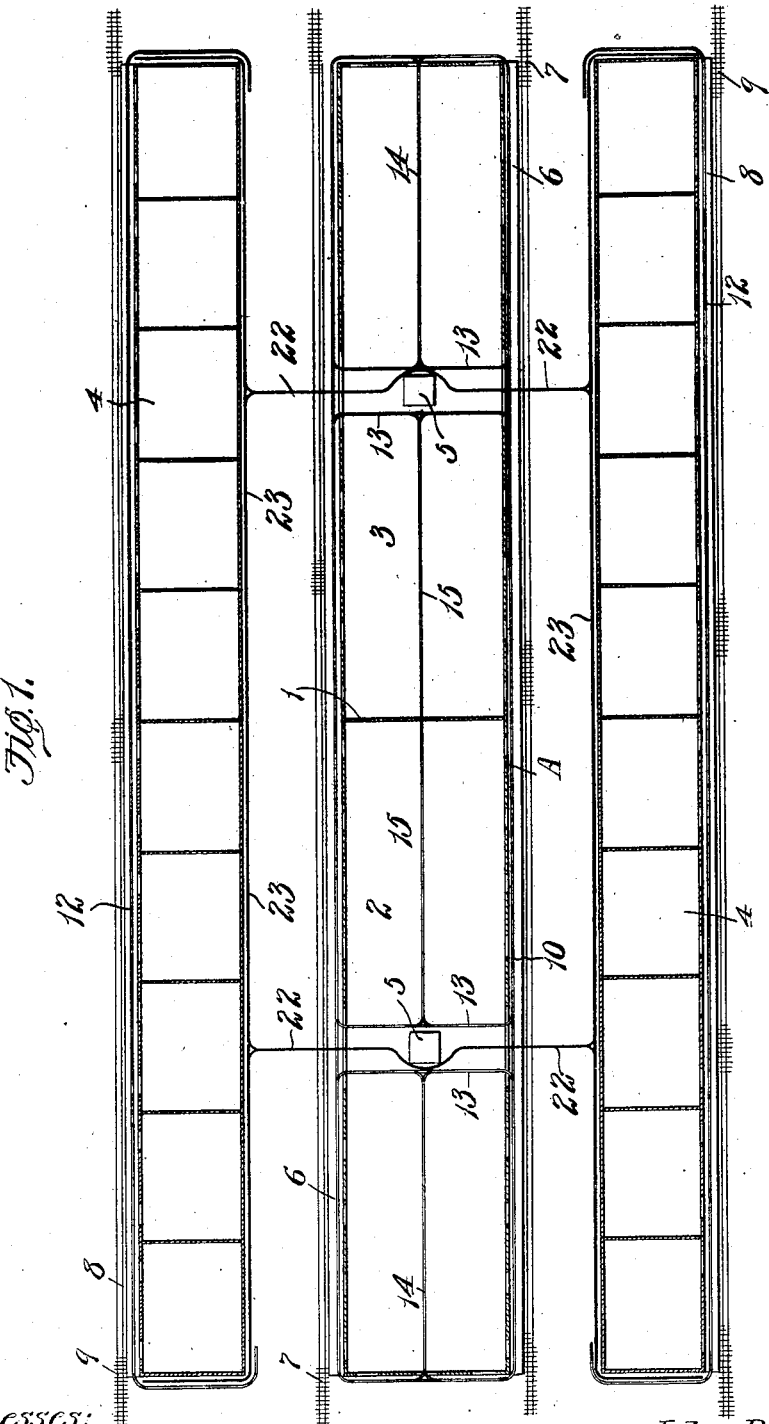

No. 897,971. PATENTED SEPT. 8, 1908.
J. R. FORDYCE.
PLANT FOR STORING AND COMPRESSING COTTON.
APPLICATION FILED NOV. 21, 1906.

4 SHEETS—SHEET 1.

Witnesses:
Geo. R. Ladoon
Wells L. Church

Inventor
John R. Fordyce.
By Bakewell & Cornwall
attys.

No. 897,971. PATENTED SEPT. 8, 1908.
J. R. FORDYCE.
PLANT FOR STORING AND COMPRESSING COTTON.
APPLICATION FILED NOV. 21, 1906.
4 SHEETS—SHEET 2.
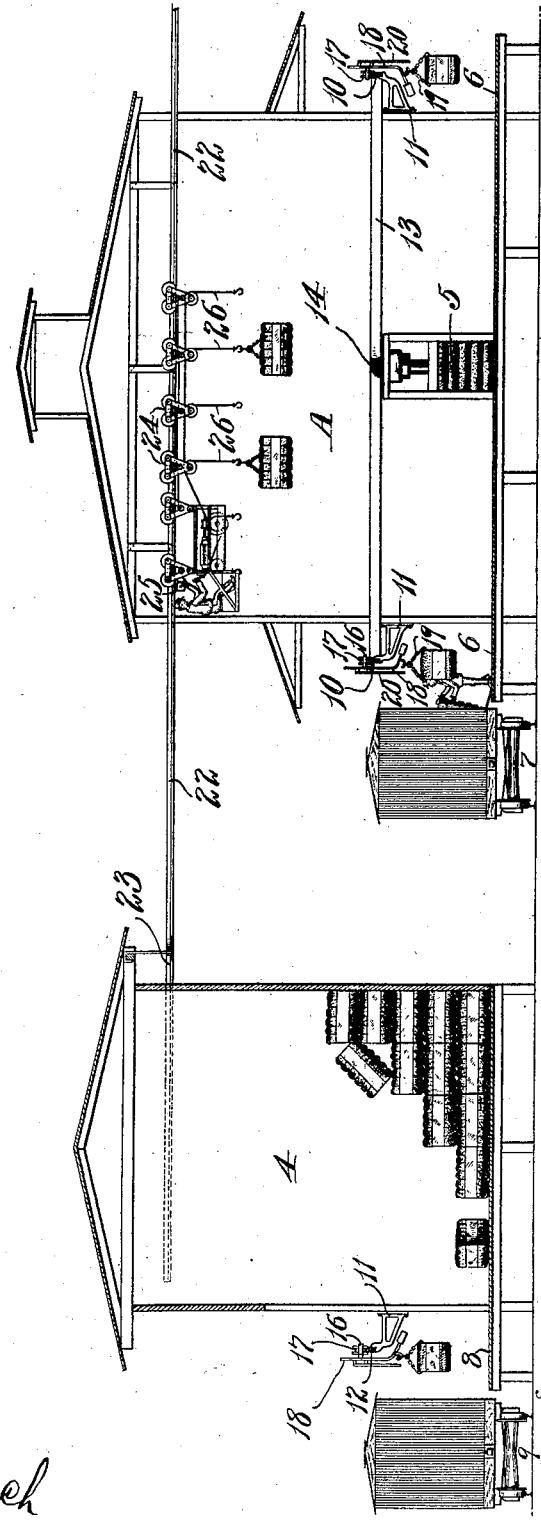
Witnesses:
Geo. R. Ladson
Nells L. Church
Inventor,
John R. Fordyce.
By
Bakewell Cornwell
Attorneys.

No. 897,971. PATENTED SEPT. 8, 1908.
J. R. FORDYCE.
PLANT FOR STORING AND COMPRESSING COTTON.
APPLICATION FILED NOV. 21, 1906.
4 SHEETS—SHEET 3.
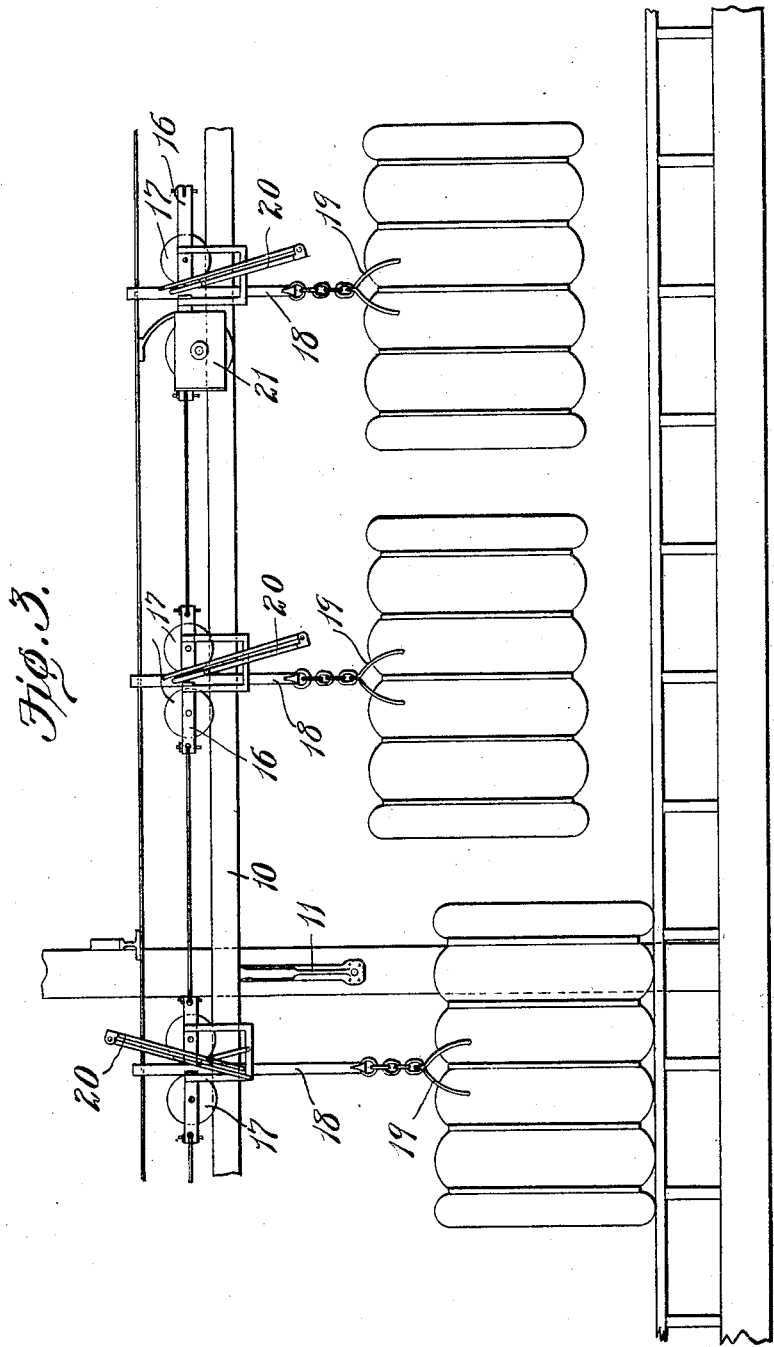
Witnesses:
Edgar T. Farmer
Wells L. Church
Inventor,
John R. Fordyce.
By Bakewell + Cornwall
attys.

No. 897,971. PATENTED SEPT. 8, 1908.
J. R. FORDYCE.
PLANT FOR STORING AND COMPRESSING COTTON.
APPLICATION FILED NOV. 21, 1906.
4 SHEETS—SHEET 4.
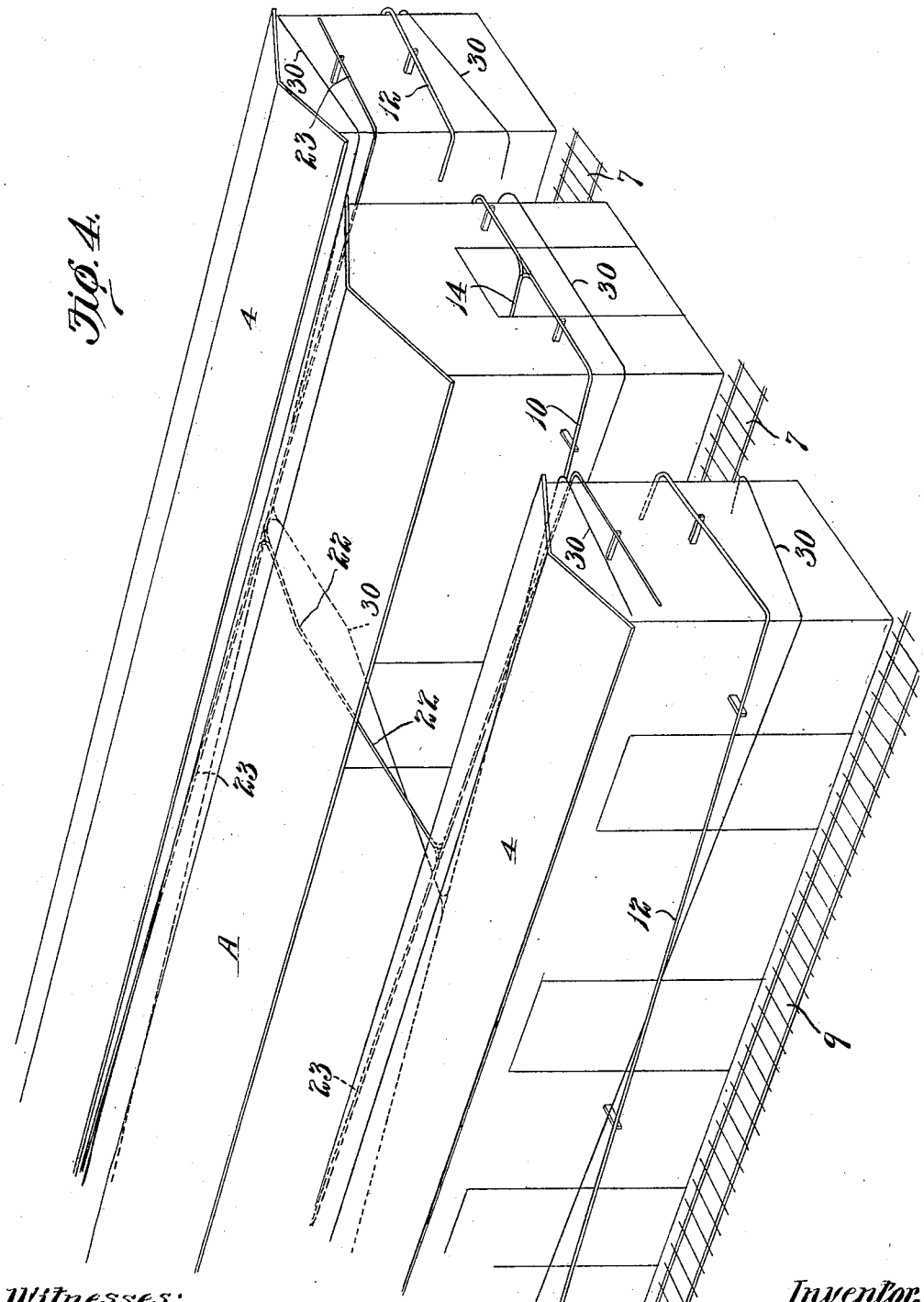

UNITED STATES PATENT OFFICE.

JOHN R. FORDYCE, OF LITTLE ROCK, ARKANSAS.

PLANT FOR STORING AND COMPRESSING COTTON.

No. 897,971.  Specification of Letters Patent.  Patented Sept. 8, 1908.

Application filed November 21, 1906. Serial No. 344,441.

*To all whom it may concern:*

Be it known that I, JOHN R. FORDYCE, a citizen of the United States, residing at Little Rock, Pulaski county, Arkansas, have invented a certain new and useful Improvement in Plants for Storing and Compressing Cotton, of which the following is a full, clear, and exact description, such as will enable others skilled in the art to which it appertains to make and use the same, reference being had to the accompanying drawings, forming part of this specification, in which—

Figure 1 is a diagrammatic view illustrating a plant constructed in accordance with my invention; Fig. 2 is a transverse sectional view taken through one of the compress sheds and warehouses; Fig. 3 is a detail view showing one type of trolley which can be used for carrying bales of cotton around the plant; and Fig. 4 is a perspective view illustrating a trolley system in which the trolleys are operated by gravity.

This invention relates to plants for storing and compressing cotton.

The object of my invention is to provide a compress consisting of warehouses, sheds and cotton presses arranged in certain relation to each other, and systems of trolleys for carrying the bales of cotton from the point where they are unloaded, to the presses, to the warehouses and also to the point where they are shipped, thereby enabling the cotton to be handled expeditiously and economically.

The plant which I have herein illustrated as representing the preferred form of my invention, comprises two trolley systems, one which I will hereinafter refer to as the "platform system", being utilized for conveying the cotton from the cars to the sheds in which the presses are located, and from the warehouses to the cars in which the cotton is re-shipped, and the other system which I will refer to as the "overhead system", being utilized for conveying the cotton from the presses to the warehouses.

Referring to Fig. 1 of the drawings, A designates an oblong-shaped building provided with a partition 1 which divides it into two sheds, 2 and 3. Arranged on each side of said building is a row of warehouses 4 and at approximately the center of each of the sheds 2 and 3 is a cotton press 5. By locating the presses at the points indicated a great saving is effected in the handling of the cotton, due to the fact that each press is approximately in the center of a large square, the sides of which are the width of the plant and one-half of the total length of the plant so that the cotton can be grouped around the presses and thus overcome the necessity of carrying it a great distance.

Extending alongside of the sheds 2 and 3 are receiving platforms 6 and extending longitudinally of said platforms are railroad sidings 7, thereby enabling the cotton to be unloaded from the cars onto said platforms. Shipping platforms 8 extend along the outside of the rows of warehouses 4 with railroad sidings 9 adjacent said platforms, as shown in Figs. 1 and 2, so that when the cotton is to be reshipped it can be carried from the warehouses to any point on the platforms at which the outbound freight cars are located.

The platform trolley system previously referred to, consists of a track 10 extending along the outside of the sheds 2 and 3 and supported by brackets 11 at a sufficient height above the receiving platforms to permit people to pass thereunder, and a track 12 extending along the rows of warehouses above the platforms 8 and also across the endmost warehouses in each row, said tracks being supported in the same manner as the tracks 10. On the inside of the sheds 2 and 3 are two parallel transversely extending tracks 13 between which the press 5 is located and also two longitudinally extending tracks 14 and 15, said tracks connecting with the cross tracks and the track 14 and also the tracks 13 connecting with the outside track 10, switches of any suitable design or pattern being located at the points where the tracks intersect. The trolleys or conveyers which run on the tracks may be of any suitable design and can be operated by electricity, cable, gravity, or any motive power.

In Fig. 3 I have shown a section of the track of the platform system and some of the trolleys which run thereon. The trolley consists of a frame 16 provided with two grooved wheels 17 which travel on the track and means for elevating a bale of cotton and holding it suspended above the platform. Said means consists of a bar 18 to which a pair of cotton hooks 19 is connected by chains and a lever 20 pivoted to the frame and connected at its inner end to the bar 18 so that by pulling down on the outer end of said lever the bar 18 will be elevated and thus raise the cotton from the platform.

Each of the hooks 19 is of substantially inverted Y-shape and is provided at its lower end with two prongs that project into the bale of cotton, the hooks being provided at their upper ends with rings or eyes to which the chain is fastened that connects the hooks together. The lever 20 is so connected to the frame of the trolley that when said lever is moved into a certain position it will be locked automatically and thus hold the bale elevated. The trolleys can be run either singly or in trains, as shown in Fig. 3, wherein a motor 21 is shown as pulling several trailers that are coupled together by bars 21ª. When the trolleys are operated by gravity the tracks on which they travel will be inclined downwardly from the ends towards the center of the plant, and means, such for example, as oppositely inclined tracks 30, will be provided for returning the trolleys to the points from which they started as shown in Fig. 4. As previously stated, however, it is immaterial so far as my broad idea is concerned, how the trolleys are operated or what the construction of the trolleys, tracks or switches may be.

After the bales of cotton have been unloaded from the cars onto the platform 6 extending along the sides of the sheds 2 and 3 they are hooked onto the trolleys which carry them on the tracks 10 and 13 to the presses 5 or at some point within the sheds away from the presses on the longitudinally extending tracks 14 and 15. By utilizing a system of this character I overcome the necessity of switching the inbound freight cars so as to locate them at any particular point on the receiving platform and as hand-trucking of the cotton for long distances is eliminated a great saving in time and also cost of labor is effected.

If the cotton is to be stored after it has been compressed it is carried by the trolleys of the overhead system to the warehouses and when it is re-shipped it is carried by the trolleys which travel on the tracks 9 of the platform system to any point on the shipping platforms 8 where the outbound freight cars may be located.

The overhead system consists of tracks 22 which are located adjacent the roof of the sheds and extend from the presses 5 to tracks 23 extending along one side and the ends of the rows of warehouses. The trolleys or conveyers of the overhead system may be of any suitable design and are provided with means for raising the bales to a sufficient height to clear the tracks of the platform system and also the freight cars standing on the railroad sidings, as shown in Fig. 2.

After the bales have been carried across the railroad tracks from the sheds to the warehouses they are conveyed by the trolleys of the platform system to any one of the warehouses in the row. Another advantage of the overhead system is that it can be utilized for piling or unpiling the bales of cotton. In Fig. 2 I have shown the trolleys of the overhead system as consisting of a plurality of trailers 24 coupled together and pulled by a motor 25. Ropes 26 which extend downward from the trailers have bales of cotton connected thereto, and the motor is provided with a drum onto which the ropes are wound for elevating the bales of cotton to the required height. Instead of using a trailer for each bale of cotton I can use two trailers which support a bar having a plurality of bales connected thereto, the bar, of course, being carried by ropes which are wound onto a drum or other suitable device on the motor. While I prefer to use the overhead system in conjunction with the platform system it would, of course, be possible to use merely a platform system and have an elevator on which a train of conveyers can be placed, then elevated enough to carry them over the freight cars, then lowered on the other side and carried along to the warehouses. Furthermore, while it is desirable to equip the plant with a trolley system for handling the bales I do not wish it to be understood that my invention is limited to this feature as one important feature of my invention consists in a plant comprising a compress shed having a compress located at approximately the center thereof, railway tracks extending along the sides of the shed and two rows of warehouses located on the other sides of said railway tracks and extending parallel to the compress sheds with railway tracks running past the front doors of the warehouses, thereby producing a plant in which the cotton compress is located at approximately the center of the entire plant.

Having thus described my invention, what I claim as new and desire to secure by Letters Patent is:

1. A plant for handling bales of cotton, consisting of a shed a cotton compress located in said shed, warehouses arranged in rows on opposite sides of said shed, and a trolley system comprising tracks and trolleys traveling thereon for carrying the bales of cotton from the compress shed to the warehouses and from the warehouses to the point at which the cotton is shipped; substantially as described.

2. A plant for handling bales of cotton, consisting of sheds, cotton presses located inside of said sheds, platforms extending longitudinally of said sheds, for receiving the inbound cotton, warehouses arranged in rows adjacent said sheds, platforms running along the outsides of said warehouses, and a trolley system consisting of tracks extending over said receiving platforms and inside of said sheds and also to the platforms outside of the warehouses, and trolleys traveling on said tracks for carrying the bales of cotton to points inside of the compress sheds and to the warehouses; substantially as described.

3. A plant for handling bales of cotton, consisting of sheds cotton presses located inside of said sheds, warehouses in which the cotton is stored arranged in rows on opposite sides of said sheds, and a trolley system comprising tracks which extend along the outside of the sheds and warehouses and also into the interior of said sheds and having trolleys traveling thereon for conveying bales of cotton; substantially as described.

4. A plant for handling bales of cotton, consisting of receiving platforms, a cotton press located at approximately the center of the plant, trolley tracks arranged above said platforms and having trolleys traveling thereon which are provided with means for elevating and carrying bales of cotton, rows of warehouses in which cotton is to be stored and being located some distance from the receiving platforms, and trolley tracks extending from the receiving platforms past the front doors of the warehouses; substantially as described.

5. A plant for handling bales of cotton, consisting of compress sheds provided with receiving platforms extending along the sides thereof, a trolley system consisting of tracks arranged above said platforms and tracks arranged inside of said sheds and leading to the outside tracks, rows of warehouses provided with outside platforms and located on opposite sides of said compress sheds, trolley tracks extending above said warehouse platforms, a railroad siding located between said warehouses and compress sheds, an overhead trolley system consisting of tracks which extend from the compress sheds to the warehouses, and trolleys traveling on the tracks of both systems for carrying bales of cotton; substantially as described.

6. A plant for handling bales of cotton, consisting of an oblong-shaped building provided with outside platforms, railroad tracks extending alongside of said platforms, trolley tracks arranged above said platforms and extending into the interior of said building, a row of warehouses on each side of said building and provided with outside platforms, railroad tracks extending alongside of the platforms just mentioned, trolley tracks extending over the platforms of the warehouses, an overhead trolley system consisting of tracks that are arranged adjacent the roof of said building and extending over the railroad track first-mentioned to the warehouses, and trolleys traveling on said trolley tracks for carrying bales of cotton; substantially as described.

7. A plant for handling bales of cotton, comprising a building provided with receiving platforms extending along the outside thereof, trolley tracks extending longitudinally of said platforms, trolley tracks extending longitudinally and transversely of the inside of said building and connecting with the tracks over the platforms, an overhead trolley system consisting of tracks that are located adjacent the roof of the building, and conveyers traveling on said trolley tracks and provided with means for elevating bales of cotton and holding them suspended; substantially as described.

8. A plant for handling bales of cotton, consisting of a compress shed provided with outside receiving platforms, a cotton press located at approximately the center thereof, railway tracks extending along the outsides of the shed, two rows of warehouses arranged on the other sides of said tracks and extending parallel to the compress shed, railway tracks extending along the front sides of the rows of warehouses, and trolley tracks extending over the receiving platforms of the compress shed and along the sides of said warehouse, and an overhead trolley system comprising tracks which extend from the compress shed to the rows of warehouses; substantially as described.

9. A plant for handling bales of cotton, consisting of a plurality of long compress sheds arranged end to end, a cotton press located at approximately the center of each shed, railway tracks running along the outsides of said sheds, a row of warehouses arranged on the opposite sides of said sheds and extending parallel thereto at such a distance from said tracks that passageways are formed between the tracks and warehouses, railway tracks extending alongside the front doors of said warehouses, a trolley system comprising tracks and trolleys for conveying bales of cotton from the railway tracks to the cotton presses, and an overhead trolley system for conveying the bales from the cotton presses to the warehouses; substantially as described.

10. A plant for handling cotton comprising a receiving platform, a plurality of warehouses arranged in rows, a shipping platform, a cotton press located at approximately the center of the plant, and trolleys traveling on tracks for conveying the bales of cotton from the receiving platform to the cotton press, from the cotton press to the warehouses and from the warehouses to any desired point on the shipping platform; substantially as described.

11. In a plant for storing baled cotton, a receiving station, a shipping station, a plurality of warehouses arranged in rows, a cotton press located at approximately the center of the plant, trolley systems comprising inclined tracks having trolleys traveling thereon for conveying the cotton around the plant from the receiving station to the warehouses or cotton press and from the warehouses or press to the shipping station, and oppositely inclined trolley tracks on which the trolleys are returned to the points from which they started; substantially as described.

12. In combination, a trolley, a pair of cotton bale hooks connected together by a flexible device and each hook being provided with a plurality of prongs that project into the bale, and a connection between said hooks and trolley; substantially as described.

13. In combination, a trolley, a cotton bale supporting member connected to said trolley and consisting of a pair of double pronged hooks connected together by a flexible device, and means for raising and lowering said hooks; substantially as described.

14. In combination, a trolley, a member depending from said trolley, a pair of inverted Y-shaped devices provided at their lower ends with prongs which are adapted to project into a bale of cotton, a chain connecting said devices together and being secured to said member, and means for raising and lowering said member; substantially as described.

15. In combination, a trolley, a cotton bale supporting member consisting of a pair of hooks connected together by a chain, each hook consisting of an inverted Y-shaped device provided at its upper end with an eye to which the chain is connected and at its lower end with prongs that project into the bale, a member for supporting said hooks, and means for raising and lowering said member; substantially as described.

16. In combination, a track, a plurality of trolleys mounted on said track, a rigid bar coupling said trolleys together, members depending from said trolleys, cotton bale hooks carried by said members, and means for actuating said members to raise and lower the cotton bale hooks; substantially as described.

17. In combination, a track, a plurality of trolleys mounted on said track, means for coupling said trolleys together, members depending from said trolleys, cotton bale hooks carried by said members, and means for actuating said members to raise and lower the cotton bale hooks; substantially as described.

In testimony whereof I hereunto affix my signature in the presence of two witnesses, this 30 day of October 1906.

JOHN R. FORDYCE.

Witnesses:
COLUMBUS BIERCE,
A. G. CRAWFORD.